United States Patent
Qu

(10) Patent No.: US 12,316,143 B2
(45) Date of Patent: May 27, 2025

(54) TERMINAL DEVICE CHARGING METHOD AND APPARATUS, AND STORAGE MEDIUM

(71) Applicant: ZTE Corporation, Shenzhen (CN)

(72) Inventor: Jiayu Qu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 691 days.

(21) Appl. No.: 17/639,605

(22) PCT Filed: Sep. 3, 2020

(86) PCT No.: PCT/CN2020/113300
§ 371 (c)(1),
(2) Date: Mar. 2, 2022

(87) PCT Pub. No.: WO2021/043222
PCT Pub. Date: Mar. 11, 2021

(65) Prior Publication Data
US 2022/0329087 A1 Oct. 13, 2022

(30) Foreign Application Priority Data
Sep. 3, 2019 (CN) .......................... 201910829537.1

(51) Int. Cl.
*H02J 7/00* (2006.01)
*H02J 7/34* (2006.01)
*H04L 9/40* (2022.01)

(52) U.S. Cl.
CPC ...... *H02J 7/00034* (2020.01); *H02J 7/00045* (2020.01); *H02J 7/007* (2013.01); *H02J 7/342* (2020.01); *H04L 63/164* (2013.01)

(58) Field of Classification Search
CPC .... H02J 7/00034; H02J 7/00045; H02J 7/007; H02J 7/342; H04L 63/164
(Continued)

(56) References Cited

U.S. PATENT DOCUMENTS 10,673,261 B2 * 6/2020 Zeng .................. H02J 7/007
2016/0064959 A1 * 3/2016 Jung .................. H02J 7/00034
(Continued)

FOREIGN PATENT DOCUMENTS

| CN | 106849263 A | 6/2017 |
| CN | 109687545 A | 4/2019 |
| WO | 2019162750 A1 | 8/2019 |

OTHER PUBLICATIONS

International Searching Authority. International Search Report and Written Opinion for PCT Application No. PCT/CN2020/113300 and English translation, mailed Nov. 26, 2020, pp. 1-10.
(Continued)

*Primary Examiner* — Richard Isla
*Assistant Examiner* — Aaron Piggush
(74) *Attorney, Agent, or Firm* — Vivacqua Crane, PLLC

(57) ABSTRACT

A charging method and apparatus for a terminal device, and a storage medium are disclosed. The method may include: in response to determining that the terminal device is connected to a charging connection device, acquiring each charging power corresponding to a respective one of a plurality of quick charging protocols stored in the terminal device that is matched with the charging connection device; determining, as a target quick charging protocol, a quick charging protocol corresponding to the charging power satisfying a preset condition; and, charging by using the target quick charging protocol.

18 Claims, 4 Drawing Sheets

When it is determined that a terminal device is connected to a charging connection device, acquire each charging power corresponding to a respective one of a plurality of quick charging protocols stored in the terminal device that is matched with the charging connection device — Step 201

Determine, as a target quick charging protocol, a quick charging protocol corresponding to the charging power satisfying a preset condition — Step 202

Charge by using the target quick charging protocol — Step 203

(58) Field of Classification Search
USPC .................................. 320/112, 114, 134, 162
See application file for complete search history.

(56) References Cited

U.S. PATENT DOCUMENTS

| | | | |
|---|---|---|---|
| 2017/0222459 A1 | 8/2017 | Kang | |
| 2018/0048170 A1* | 2/2018 | Sun | H02J 7/00047 |
| 2020/0076204 A1* | 3/2020 | Chen | H02J 7/00041 |

OTHER PUBLICATIONS

European Patent Office. Extended European Search Report for EP Application No. 20860264.9, mailed Jul. 8, 2022, pp. 1-7.

\* cited by examiner

TERMINAL DEVICE CHARGING METHOD AND APPARATUS, AND STORAGE MEDIUM

CROSS-REFERENCE TO RELATED APPLICATION

This application is a national stage filing under 35 U.S.C. § 371 of international application number PCT/CN2020/113300, filed Sep. 3, 2020, which claims priority to Chinese patent application No. 201910829537.1, filed Sep. 3, 2019. The contents of these applications are incorporated herein by reference in their entirety.

TECHNICAL FIELD

The present disclosure relates to, but not limited to, the technical field of terminals.

BACKGROUND

With the development of communication technologies, terminal devices such as mobile phones are used more and more widely. In order to solve the battery life of terminal devices and improve the user experience, most terminal devices are equipped with quick charging technologies. At present, due to the difference among various quick charging technologies and the limitation of hardware devices of terminal devices, it is difficult for various quick charging protocols to be compatible, and the terminal devices can only use dedicated charging devices, thereby bringing great inconvenience to users.

At present, the USB power delivery (USB-PD) protocol can be provided by the universal serial bus implementers forum (USB-IF) to unify various quick charging protocols. However, the above scheme can only solve the disunity of quick charging technologies, but cannot make the existing quick charging protocols compatible with each other. When a user carries a plurality of terminal devices, the user also need to carry a plurality of corresponding charging adapters, leading to poor the user experience.

SUMMARY

The present disclosure provides a charging method and apparatus for a terminal device, and a storage medium, in order to deal with the technical problem of poor user experience in the existing charging methods.

An embodiment of the present disclosure provides a charging method for a terminal device, the method may include: in response to determining that the terminal device is connected to a charging connection device, acquiring each charging power corresponding to a respective one of a plurality of quick charging protocols stored in the terminal device that is matched with the charging connection device; determining, as a target quick charging protocol, a quick charging protocol corresponding to the charging power satisfying a preset condition; and, charging by using the target quick charging protocol.

An embodiment of the present disclosure provides a charging apparatus for a terminal device, the apparatus may include: an acquisition module, configured to: in response to determining that the terminal device is connected to a charging connection device, acquire each charging power corresponding to a respective one of a plurality of quick charging protocols stored in the terminal device that is matched with the charging connection device; a first determination module, configured to determine, as a target quick charging protocol, a quick charging protocol corresponding to the charging power satisfying a preset condition; and, a charging module, configured to charge by using the target quick charging protocol.

An embodiment of the present disclosure provides a terminal device, the terminal device may include: one or more processors; and, a memory configured to store one or more programs which, when executed by the one or more processors, cause the one or more processors to perform the charging method for a terminal device described in any one of the embodiments of the present disclosure.

More descriptions of the above embodiments and other aspects of the present disclosure and the implementations thereof will be provided in the BRIEF DESCRIPTION OF THE DRAWINGS, the DETAILED DESCRIPTION and the CLAIMS.

DETAILED DESCRIPTION

The present disclosure provides a charging method and apparatus for a terminal device, and a storage medium, in order to deal with the technical problem of poor user experience in the existing charging methods.

In order to make the objectives, technical schemes and advantages of the present disclosure clearer, the embodiments of the present disclosure will be described in detail below with reference to the accompanying drawings. It is to be noted that the embodiments in the present disclosure and the features in the embodiments can be arbitrarily combined with each other if not conflicted.

Figure 1A:
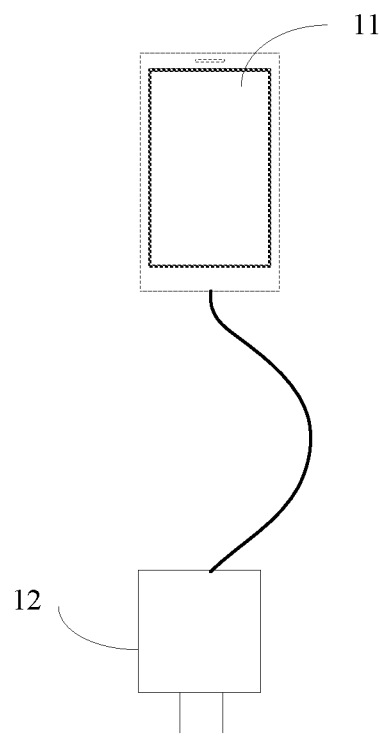
FIG. 1A is a schematic diagram of an application scenario of a charging method for a terminal device according to an embodiment of the present disclosure.
Figure 1B:
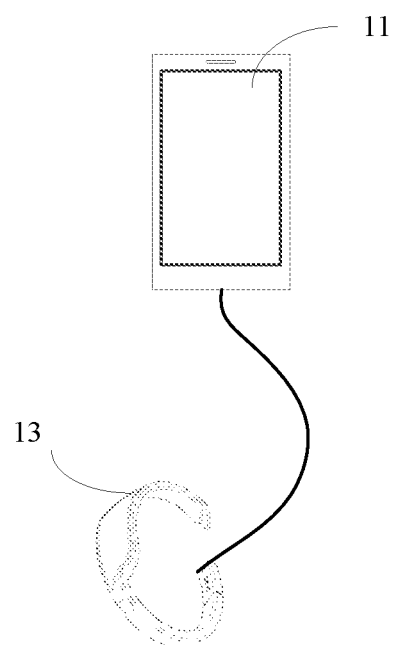
FIG. 1B is a schematic diagram of another application scenario of the charging method for a terminal device according to an embodiment of the present disclosure.

FIG. 1A is a schematic diagram of an application scenario of a charging method for a terminal device according to an embodiment of the present disclosure. FIG. 1B is a schematic diagram of another application scenario of the charging method for a terminal device according to an embodiment of the present disclosure. As shown in FIG. 1A, according to the charging method for a terminal device of the embodiment of the present disclosure, it may be that the terminal device 11 charges its own battery through a charging adapter 12. As shown in FIG. 1B, according to the charging method for a terminal device of the embodiment of the present disclosure, it may also be that the terminal device 11 charges the battery of the device to be charged 13 when it is in a power output mode. For example, the device to be charged 13 may be wearable devices such as smart bracelets. That is, the charging connection device involved in the present disclosure includes: a charging adapter or other devices to be charged which are to be charged by the terminal device. The quick charging protocol involved in the present disclosure refers to a charging mode in which, in a preset period of time from an initial charging state, an average current entering the battery is greater than or equal to a preset current value or the total charging capacity is greater than or equal to a preset percentage of the rated capacity of the battery. For example, the preset current value is 3A, and the preset percentage is 60%. Since various existing quick charging protocols are incompatible, a user needs to carry a plurality of corresponding charging adapters when carrying a plurality of terminal devices; or, when the user needs to charge other devices to be charged, if the quick charging protocol configured for the device to be charged is incompatible with the quick charging protocol of the terminal device, it is unable to charge the device to be charged by the terminal device, resulting in poor user experience.

In the charging method for a terminal device according to the embodiments of the present disclosure, a plurality of quick charging protocols are stored in the terminal device, so that the possibility of making the quick charging protocol of the terminal device compatible with the quick charging protocol of the charging connection device is increased. Then, the quick charging protocol corresponding to the charging power satisfying a preset condition is selected as a target quick charging protocol according to each charging power corresponding to the respective quick charging protocol matched with the charging connection device among the plurality of quick charging protocols. Finally, charging is performed by using the target quick charging protocol. Thus, on one hand, the compatibility of the quick charging protocol of the terminal device and the quick charging protocol of the charging connection device is realized, and the user does not need to carry a plurality of charging adapters; or, other devices to be charged can be charged quickly by the terminal device. On the other hand, a quick charging protocol corresponding to the suitable charging power is selected for charging, so that the charging efficiency is improved. Therefore, by the charging method for a terminal device according to the embodiments of the present disclosure, the user experience is improved.

Figure 2:
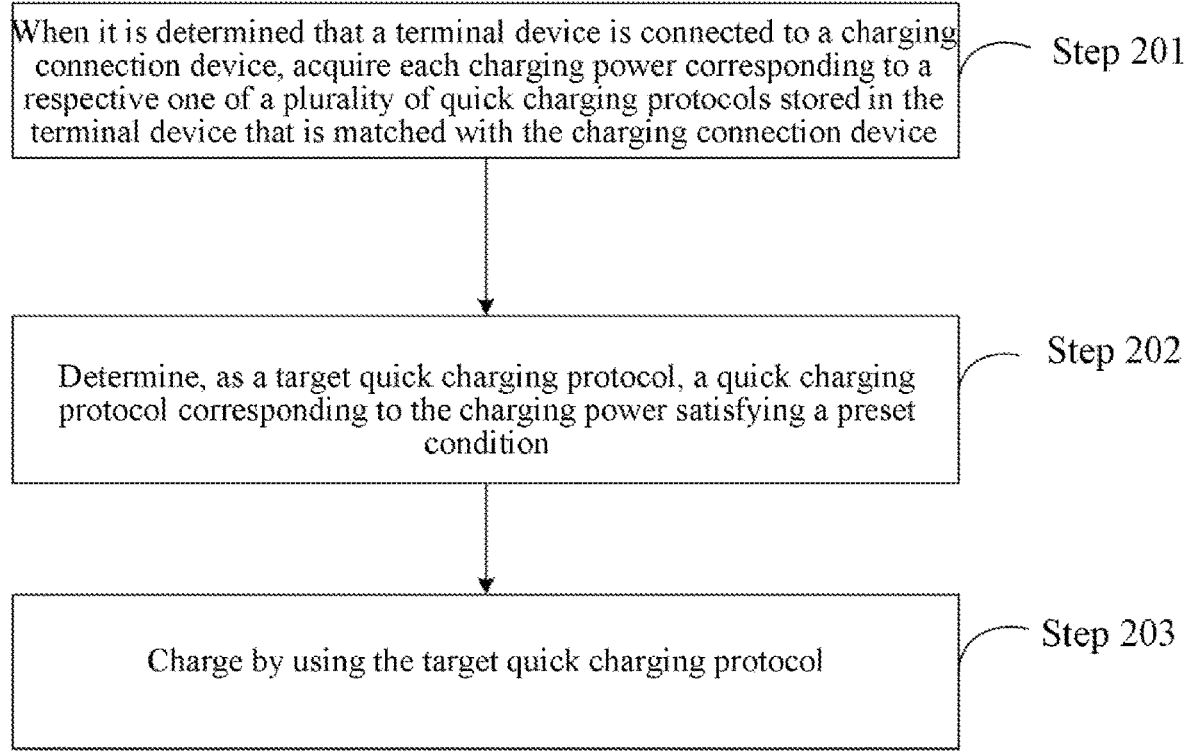
FIG. 2 is a flowchart of the charging method for a terminal device according to an embodiment of the present disclosure.

FIG. 2 is a flowchart of the charging method for a terminal device according to an embodiment of the present disclosure. This embodiment is suitable for scenarios where the battery of the terminal device is charged through the charging adapter or the terminal device charges the battery of a device to be charged when the terminal device is in a power output mode. This embodiment can be executed by the charging apparatus of the terminal device. The charging apparatus of the terminal device can be implemented by software and/or hardware, or the charging apparatus of the terminal device can be integrated in the terminal device. As shown in FIG. 2, the charging method for a terminal device provided in this embodiment includes steps 201 to 203.

In a step of 201, when it is determined that the terminal device is connected to a charging connection device, each charging power corresponding to a respective one of a plurality of quick charging protocols stored in the terminal device that is matched with the charging connection device is acquired.

In this embodiment, the terminal device may be handheld devices, mobile terminals, wearable devices, computing devices, various forms of user equipments (UEs) or the like. For example, the terminal device in this embodiment may be a mobile phone.

When the terminal device is connected to the charging connection device, the terminal device will detect a voltage on a preset pin, so that it is determined that the terminal device is connected to the charging connection device.

A plurality of quick charging protocols are stored in the terminal device in this embodiment. The plurality of quick charging protocols may also be referred to as firmware. Among the plurality of quick charging protocols, there may be a plurality of quick charging protocols matched with the charging connection device.

In an application scenario, the charging connection device is a charging adapter. The charging adapter may also be referred to as a charging plug for converting domestic AC current into low-voltage DC current.

There are several possible implementations for the plurality of quick charging protocols. In the first possible implementation, the plurality of quick charging protocols all stipulate that handshake protocols are initiated by the charging adapter. In the second possible implementation, the plurality of quick charging protocols all stipulate that handshake protocols are initiated by the terminal device. In the third possible implementation, some of the plurality of quick charging protocols stipulate that handshake protocols are initiated by the charging adapter, while the other quick charging protocols stipulate that handshake protocols are initiated by the terminal device.

With regard to the first possible implementation, the implementation process of step 201 may be as follows: upon receiving a charging protocol handshake packet transmitted by the charging adapter, determining each of the plurality of quick charging protocols that is matched with the charging protocol handshake packet; making a response according to each quick charging protocol matched with the charging protocol handshake packet; and, determining each charging power corresponding to a respective quick charging protocol matched with the charging protocol handshake packet.

In an embodiment, the charging protocol handshake packet transmitted by the charging adapter may include a protocol identifier. Upon receiving the charging protocol handshake packet transmitted by the charging adapter, the terminal device determines, according to the protocol identifier in the charging protocol handshake packet, each quick charging protocol of the plurality of quick charging protocols stored locally that is matched with the protocol identifier in the charging protocol handshake packet. Then, the terminal device makes a response according to each quick charging protocol. Here, the response means that the preset voltage is applied to the charging pin in the terminal device or a message is fed back to the charging adapter after the preset voltage is applied to the charging pin in the terminal device according to the stipulation of the quick charging protocol. After a response is made, which is equivalent to that the terminal device has negotiated the charging voltage and the charging current with the charging adapter, the charging power corresponding to the quick charging protocol matched with the charging protocol handshake packet can be determined.

With regard to the second possible implementation, the implementation process of step 201 may be as follows: performing charging protocol detection on the charging adapter by using a first quick charging protocol; if the charging adapter's response to the first quick charging protocol is detected, handshaking with the charging adapter by using the first quick charging protocol, determining a charging power corresponding to the first quick charging protocol, and using a second quick charging protocol as a new first quick charging protocol; if the charging adapter's response to the first quick charging protocol is not detected, directly using a second quick charging protocol as a new first quick charging protocol; and, returning to the step of performing charging protocol detection on the charging adapter by using a first quick charging protocol until each charging power corresponding to the respective quick charging protocol matched with the charging adapter is acquired.

In this implementation, each charging power corresponding to the respective quick charging protocol matched with the charging adapter is determined in a polling manner. The first quick charging protocol is any quick charging protocol among the plurality of quick charging protocols stored in the terminal device. The second quick charging protocol is any quick charging protocol other than the first quick charging protocol among the plurality of quick charging protocols stored in the terminal device. In this implementation, charging protocol detection is performed on the charging adapter by using the first quick charging protocol. For example, a detection packet may be transmitted to the charging adapter. If it is determined that the charging adapter can be matched with the first quick charging protocol upon receiving the charging protocol detection of the first quick charging protocol, the charging adapter feeds back to the terminal device a response to the first quick charging protocol. Then, the terminal device performs handshaking with the charging adapter by using the first quick charging protocol, then determines the charging power corresponding to the first quick charging protocol and uses the second quick charging protocol as a new first charging protocol. If it is determined that the charging adapter cannot be matched with the first quick charging protocol upon receiving the charging protocol detection of the first quick charging protocol, the charging adapter will not feed back to the terminal device a response to the first quick charging protocol, and the terminal device directly uses the second quick charging protocol as a new first quick charging protocol. Then, the process returns to the step of performing charging protocol detection on the charging adapter by using a first quick charging protocol until the plurality of quick charging protocols stored in the terminal device all perform charging protocol detection on the charging adapter. At the end, each charging power corresponding to the respective quick charging protocol matched with the charging adapter is acquired.

With regard to the third possible implementation, the implementation process of step 201 may be implemented in combination with the process in the above first possible implementation and the process in the above second possible implementation, which will not be repeated here.

Figure 3:
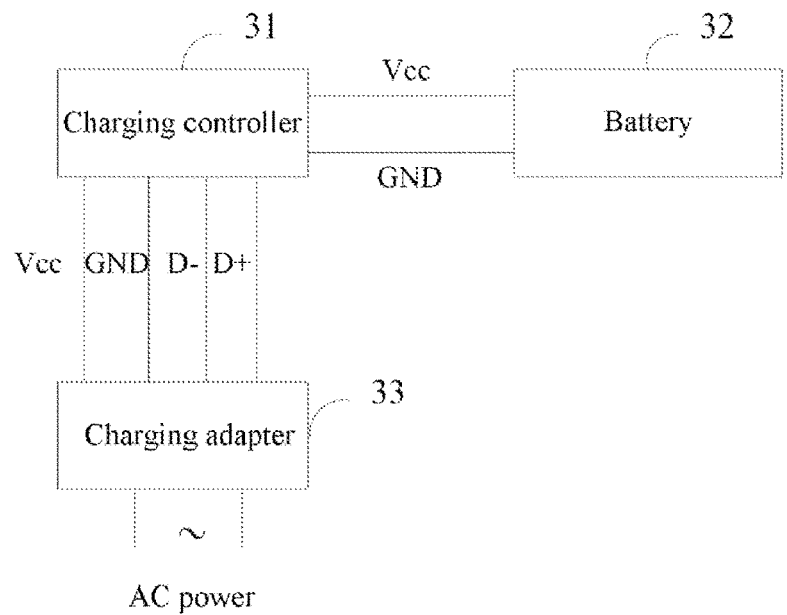
FIG. 3 is a schematic connection diagram of a charging adapter, a charging controller and a battery in the embodiment shown in FIG. 2.

FIG. 3 is a schematic connection diagram of the charging adapter, the charging controller and the battery in the embodiment shown in FIG. 2. As shown in FIG. 3, in this application scenario, the charging controller 31 is the charging controller in the terminal device, and the battery 32 is the battery in the terminal device. The charging controller 31 is configured to coordinate the charging voltage and charging current between the charging adapter 33 and the battery 32. The handshaking of most quick charging protocols occurs between the charging controller 31 and the charging adapter 33. Taking the USB2.0 protocol as an example, the charging controller 31 and the charging adapter 33 transmit handshake packets through four lines, i.e., Vcc, GND, D+ and D−, to dynamically control the output voltage and current of the power adapter. The connection between the charging controller 31 and the battery 32 is relatively simple. The charging controller 31 connects an output terminal of the charging adapter 333 to an input terminal of the battery 32 to charge the battery 32. Meanwhile, the charging controller 31 will analyze a charging state of the battery 32 and feed the charging state back to the charging adapter 33, so that the charging adapter 33 dynamically adjusts the charging state.

In another application scenario, the terminal device is in a power output mode. In this mode, the terminal deice is used as a charging host. The charging connection device is a device to be charged by the terminal device.

It is to be noted that, the terminal device may be triggered by the user to enter the power output mode, or the terminal may automatically enter the power output mode after detecting that the charging connection device is not the charging adapter.

In this scenario, the implementation process of step 201 is as follows: handshaking with the device to be charged by using a control protocol; and, after the handshaking is successful, negotiating and determining each quick charging protocol matched with the device to be charged by a transmission method defined in the control protocol, and determining each charging power corresponding to the respective quick charging protocol matched with the device to be charged.

The control protocol in this embodiment refers to a transmission protocol supported by the circuit control chip of the terminal device and the circuit control chip of the device to he charged.

In this implementation, if the terminal device is matched with the control protocol of the device to be charged, each quick charging protocol matched with the device to be charged and the corresponding charging power can be determined by one negotiation by the transmission method defined in the control protocol. It is unnecessary to determine the corresponding charging power in a polling or sequential determination manner for each quick charging protocol matched with the device to be charged. Thus, the charging efficiency is improved.

In this implementation, if control protocol handshaking cannot be realized between the terminal device and the device to be charged, that is, the terminal device is not matched with the control protocol of the device to be charged, each charging power corresponding to the respective quick charging protocol matched with the device to be charged can be determined with reference to the first possible implementation, the second possible implementation or the third possible implementation in the previous application scenario.

In a step of 202, a quick charging protocol corresponding to the charging power satisfying a preset condition is determined as a target quick charging protocol.

In an implementation, the preset condition here may be the maximum charging power. Then, step 202 is: determining, as a target quick charging protocol, a quick charging protocol corresponding to the maximum charging power.

In this implementation, charging is performed by using the determined target quick charging protocol. Since the charging power is maximal, the charging efficiency can be improved.

In another implementation, the preset condition here is any charging power greater than the preset power threshold. Then, step 202 is: determining, as a target quick charging protocol, a quick charging protocol corresponding to any charging power greater than the preset power threshold.

In a step of 203, charging is performed by using the target quick charging protocol.

In an implementation, in an application scenario where the charging connection device is a charging adapter, if the target quick charging protocol is the quick charging protocol for the last handshaking with the charging adapter, charging is directly performed by using the target quick charging protocol; and, if the target quick charging protocol is not the quick charging protocol for the last handshaking with the charging adapter, handshaking is performed with the charging adapter again by using the target quick charging protocol for charging.

In an application scenario where the charging connection device is a device to be charged, if the control protocol handshaking between the terminal device and the device to be charged is successful, during charging, handshaking is performed with the device to be charged by using the target quick charging protocol for charging. If the control protocol handshaking between the terminal device and the device to be charged is failed and the target quick charging protocol is the quick charging protocol for the last handshaking with the device to be charged, charging is directly performed by using the target quick charging protocol; and, if the control protocol handshaking between the terminal device and the device to be charged is failed and the target quick charging protocol is not the quick charging protocol for the last handshaking with the device to be charged, handshaking is performed with the device to be charged again by using the target quick charging protocol for charging.

In another implementation, after the target quick charging protocol is determined, during charging, handshaking is performed with the device to be charged again by using the target quick charging protocol for charging.

Figure 4:
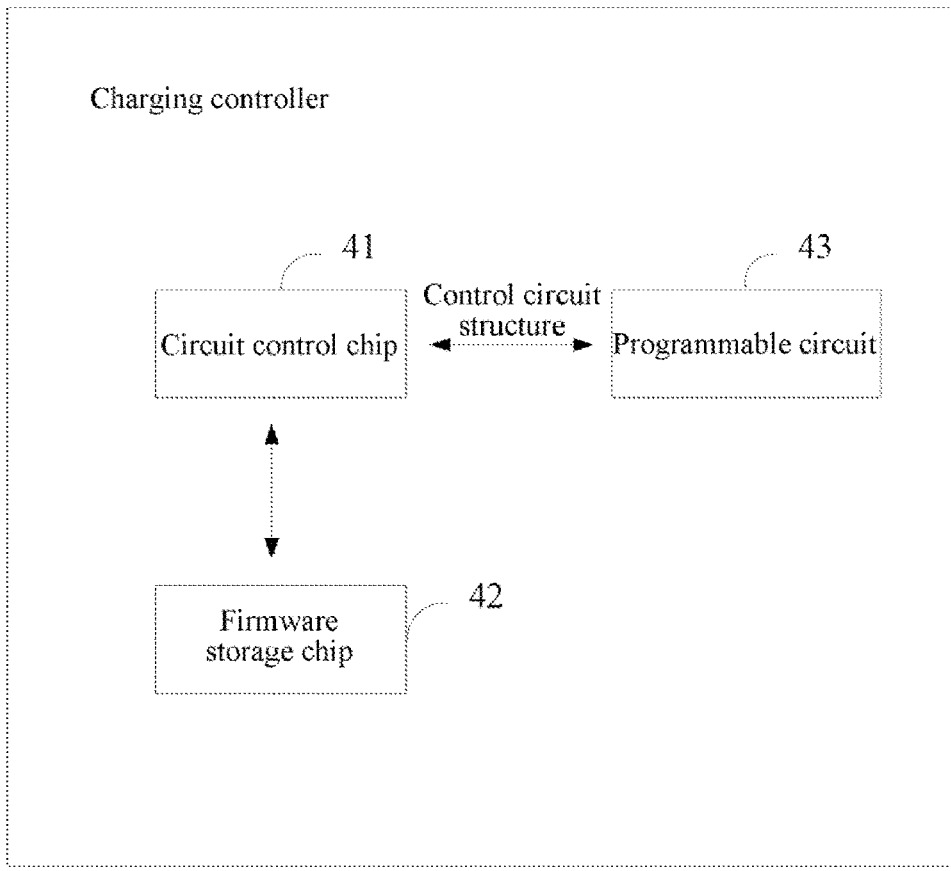
FIG. 4 is a schematic structural diagram of the charging controller in the embodiment shown in FIG. 2.

FIG. 4 is a schematic structural diagram of the charging controller in the embodiment shown in FIG. 2. As shown in FIG. 4, the charging controller provided in this embodiment includes: a circuit control chip 41, a firmware storage chip 42 and a programmable circuit 43. The plurality of quick charging protocols involved in this embodiment are stored in the firmware storage chip 42. In this embodiment, in order to enable the terminal device to be compatible with a plurality of quick charging protocols, the circuit corresponding to a fixed quick charging protocol in the terminal device in some cases is replaced with a programmable circuit. The programmable circuit 43 is a circuit with a circuit structure which can be rewritten by programming. The circuit control chip 41 can change the circuit structure of the programmable circuit under the control of the controller of the terminal device.

Figure 5:
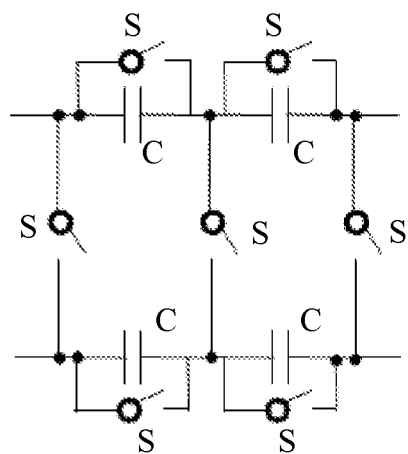
FIG. 5 is a schematic diagram of a structure of a programmable circuit in the embodiment shown in FIG. 2.

FIG. 5 is a schematic diagram of a structure of the programmable circuit in the embodiment shown in FIG. 2. As shown in FIG. 5, in this embodiment, the programmable circuit includes capacitors C and switches S. If the capacity of one independent capacitor is 1 µF, based on FIG. 5, four capacitances of 0.5 µF, 0.67 µF, 1 µF and 2 µF can be obtained by combining the switches. If the scale in FIG. 5 is expanded, the capacitance within a larger variable range can be obtained.

In this embodiment, by providing a register, a plurality of capacitors, a plurality of resistors and various switching circuits, the circuit in the charging controller can be controlled, so that the requirements for the charging circuit required by a specific quick charging protocol can be satisfied.

Based on the implementations of FIGS. 4 and 5, the charging process in step 203 may be as follows: determining a target charging parameter corresponding to the target quick charging protocol; controlling, according to the target charging parameter, a circuit control chip to adjust an input-output characteristic of a programmable circuit to a target input-output characteristic corresponding to the target charging parameter; and, charging based on the target input-output characteristic. The circuit control chip and the programmable circuit are both arranged in the terminal device.

The charging parameter corresponding to each quick charging protocol is different. Here, the charging parameter refers to the charging current, the charging voltage or the charging power. After the target charging parameter is determined, the circuit control chip is controlled to adjust the input-output characteristic of the programmable circuit to a target input-output characteristic corresponding to the target charging parameter. The input-output characteristic of the programmable circuit can be adjusted by adjusting the impedance characteristic of the programmable circuit. After the input-output characteristic of the programmable circuit is adjusted to the target input-output characteristic corresponding to the target charging parameter, charging is performed based on the target input-output characteristic.

In a scenario where the charging connection device is a charging adapter, charging by using the target quick charging protocol means that the terminal deice acquires electric energy through the charging adapter by using the target quick charging protocol.

In a scenario where the terminal device is in the power output mode and the charging connection device is a device to be charged by the terminal device, charging by using the target quick charging protocol means that the terminal device acquires electric energy from its own battery and inputs the electric energy into the battery of the device to be charged by using the target quick charging protocol.

In an embodiment, after each charging power corresponding to the respective quick charging protocol matched with the charging connection device is determined, these charging powers can be saved, so that it is convenient for the selection of a charging power satisfying the preset condition, and each determined charging power corresponding to the respective quick charging protocol matched with the charging connection device is prevented from being missed. In step 201, in the second and third possible implementations in the scenario where the charging connection device is a charging adapter, the charging power corresponding to the first quick charging protocol is saved.

Based on the above implementations, after charging is performed by using the target quick charging protocol, the charging method for a terminal device according to the embodiments of the present disclosure further includes: deleting each saved charging power corresponding to the respective quick charging protocol matched with the charging adapter, in order to save the storage space of the terminal device.

In an embodiment, when it is determined that the terminal device is connected to the charging connection device, and when it is determined that there is no quick charging protocol matched with the charging connection device in the terminal device, it is determined whether there is a quick charging protocol matched with the charging connection device in a server; when it is determined that there is a quick charging protocol matched with the charging connection device in the server, the quick charging protocol matched with the charging connection device is downloaded, and the charging connection device is disconnected; and, the charging connection device is reconnected at the end of downloading.

In the above implementation, the terminal device can transmit, to the server, a protocol identifier of the quick charging protocol matched with the charging connection device. If the server can find one or more quick charging protocol corresponding to the protocol identifier, the one or more quick charging protocols are transmitted to the terminal device. When the terminal device downloads the quick charging protocol matched with the charging connection device, the charging connection device is disconnected. The charging connection device is reconnected at the end of downloading. Then, steps 201 to 203 are continuously executed, so that charging is performed by using the target quick charging protocol.

In the above implementation, if there is also no quick charging protocol matched with the charging connection device in the server, the terminal devices performs charging by using a basic charging protocol. The basic charging protocol is a charging protocol that is supported by the terminal device and the charging connection device and is not a quick charging protocol.

In an embodiment, in the above implementation, when it is determined that there are one or more quick charging protocols matched with the charging connection device in the server, the terminal device can prompt the user whether to download the quick charging protocols. If the user determines to download the quick charging protocols, the step of downloading the quick charging protocol matched with the charging connection device and disconnecting the charging connection device is executed; and, if the user determines to not download the quick charging protocols, charging is performed by using the basic charging protocol.

In the above implementations, the quick charging protocol matched with the charging connection device is acquired from the server when there is no quick charging protocol matched with the charging connection device locally in the terminal device, so that the possibility of making the quick charging protocol of the terminal device compatible with the quick charging protocol of the charging connection device is increased, and the user experience is improved.

In an embodiment, the charging method for a terminal device may further include: upon receiving an instruction of updating the quick charging protocol, an updated quick charging protocol is acquired from the server. The instruction of updating the quick charging protocol may be triggered by the user or the server.

In accordance with the above implementation, it can be ensured that the quick charging protocol in the terminal device is the latest version of the quick charging protocol, so that the possibility of making the quick charging protocol of the terminal device compatible with the quick charging protocol of the charging connection device is increased.

The above process will be described below by an example. As an example, the charging adapter supports only the quick charge (QC) 2.0 protocol, while the terminal device does not support this QC protocol.

The handshaking principle of the QC2.0 charging protocol will be first described briefly below. A voltage signal is output to the charging adapter by the terminal device through a USB data communication port D+/D− and then input into a decoding chip through a USB built in the charging adapter to determine the voltage to be output by the charging adapter. The QC2.0 is classified into two industrial standards, i.e., level A and level B. Level A standard: the output voltage is 5 V, 9 V and 12 V; and, level B standard: the output voltage is 5 V, 9 V, 12 V and 20 V.

The normal charging process will be described below.

1. When the charging adapter is connected to the terminal device through a data cable, the charging adapter will short-circuit D+ and D− by default, so that the terminal device detects that the charging adapter is a dedicated charging port (DCP). In this case, a voltage of 5 V is output by default, and the terminal device is normally charged.

2. If the terminal device supports the QC2.0 quick charging protocol, the high voltage dedicated charger port (hvdcp) process in an Android user space is started, a voltage of 0.325 V is applied at D+ and maintained for more than 1.25 S.

3. After the charging adapter detects that the voltage at D+ is 0.325 V and maintained for more than 1.25 S, the charging adapter disconnects the short-circuit between D+ and D−. Since D+ and D− are disconnected, the voltage at D− does not change with the voltage of 0.325 V at D+. At this time, the voltage starts to drop.

4. When the terminal device detects the voltage at D− starts to drop from 0.325 V and is maintained for more than 1 S, the hvdcp reads the value of/sys/class/power supply/usb/voltage max. If the value is 9 V, the voltage at D+ is set as 3.3 V and the voltage at D− is set as 0.6 V; and, if the value is 5 V, the voltage at D+ is set as 0.6 V, and the voltage at D− is set as 0 V.

5. After the charging adapter detects the voltages at D+ and D−, the output voltage of the charging adapter is adjusted as 9 V or 5 V.

In this example, the terminal device does not support the quick charging protocol. The execution process of the terminal device will be described below.

1. After the terminal device is connected to the charging adapter, the charging adapter short-circuits D+ and D− according to the QC2.0 protocol. Since the terminal device does not support the QC2.0 protocol, the terminal device will not apply a voltage of 0.325 V at D+ but try the handshaking modes of other quick protocols stored thereon, that is, steps 201 to 203 are executed.

2. After the handshaking modes of other quick charging protocols are tried unsuccessfully, the network state is detected. If the terminal device is connected to the network, the terminal device will search for firmware update.

3. After the update is searched, the user is prompted to update to the latest charging firmware.

4. If the user refuses to update, charging is performed according to the basic charging mode.

5. If the user agrees to update, the update is downloaded, and the firmware is written into the charging controller. During updating, the charging controller is controlled to disconnect the charging adapter.

6. At the end of updating, the charging adapter is reconnected, and the handshaking operation is performed again, that is, steps 201 and 203 are executed. At this time, since the updated firmware supports the QC2.0 protocol, after the short-circuit between D+ and D1 is detected, the handshaking of a plurality of charging protocols is tried by changing the charging control circuit, and the handshaking of QC2.0 is successful.

7. After the handshaking is successful, the charging controller dynamically adjusts the programmable circuit to adapt to the voltage/current output of the charging adapter.

According to the embodiments of the present disclosure, the charging method for a terminal device includes: when it is determined that the terminal device is connected to a charging connection device, acquiring each charging power corresponding to a respective one of a plurality of quick charging protocols stored in the terminal device that is matched with the charging connection device; determining, as a target quick charging protocol, a quick charging protocol corresponding to the charging power satisfying a preset condition; and, charging by using the target quick charging protocol. By storing a plurality of quick charging protocols in the terminal device, the possibility of making the quick charging protocol of the terminal device compatible with the quick charging protocol of the charging connection device is increased. Then, the quick charging protocol corresponding to the charging power satisfying a preset condition is selected as a target quick charging protocol according to each charging power corresponding to the respective quick charging protocol matched with the charging connection device among the plurality of quick charging protocols. Finally, charging is performed by using the target quick charging protocol. Thus, on one hand, the compatibility of the quick charging protocol of the terminal device and the quick charging protocol of the charging connection device is realized, and the user does not need to carry a plurality of charging adapters; or, other devices to be charged can be charged quickly by the terminal device. On the other hand, a quick charging protocol corresponding to the suitable charging power is selected for charging, so that the charging efficiency is improved. Therefore, the charging method for a terminal device according to the present disclosure improves the user experience.

Figure 6:
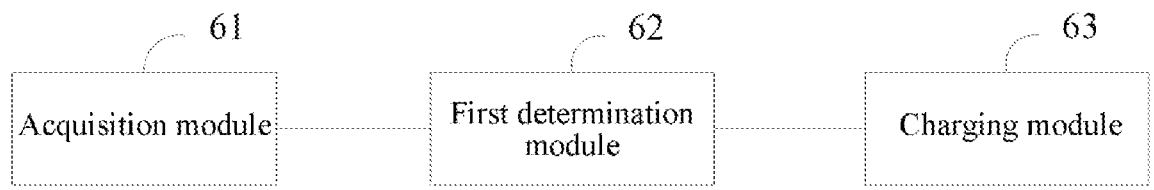
FIG. 6 is a schematic structural diagram of an charging apparatus for a terminal device according to an embodiment of the present disclosure.

FIG. 6 is a schematic structural diagram of a charging apparatus for a terminal device according to an embodiment of the present disclosure. As shown in FIG. 6, according to the embodiment of the present disclosure, the charging apparatus for a terminal device includes: an acquisition module 61, a first determination module 62 and a charging module 63.

The acquisition module 61 is configured to: when it is determined that the terminal device is connected to a charging connection device, acquire each charging power corresponding to a respective one of a plurality of quick charging protocols stored in the terminal device that is matched with the charging connection device.

In an application scenario, the charging connection device is a charging adapter. The acquisition module 61 is configured to: upon receiving a charging protocol handshake packet transmitted by the charging adapter, determine each of the plurality of quick charging protocols that is matched with the charging protocol handshake packet; make a response according to each quick charging protocol matched with the charging protocol handshake packet; and, determine each charging power corresponding to a respective quick charging protocol matched with the charging protocol handshake packet.

Based on the above implementation, the acquisition module 61 is further configured to: perform charging protocol detection on the charging adapter by using a first quick charging protocol; if the charging adapter's response to the first quick charging protocol is detected, handshake with the charging adapter by using the first quick charging protocol, determine a charging power corresponding to the first quick charging protocol, and use a second quick charging protocol as a new first quick charging protocol; if the charging adapter's response to the first quick charging protocol is not detected, directly use a second quick charging protocol as a new first quick charging protocol; and, return to the step of performing charging protocol detection on the charging adapter by using the first quick charging protocol until each charging power corresponding to the respective quick charging protocol matched with the charging adapter is acquired.

In another application scenario, the charging apparatus for a terminal device is in a power output mode, and the charging connection device is a device to be charged by the terminal device. The acquisition module 61 is configured to: handshake with the device to be charged by using a control protocol; and, after the handshaking is successful, negotiate and determine each quick charging protocol matched with the device to be charged by a transmission method defined in the control protocol, and determine each charging power corresponding to the respective quick charging protocol matched with the device to be charged.

The first determination module 62 is configured to determine, as a target quick charging protocol, a quick charging protocol corresponding to the charging power satisfying a preset condition.

In an embodiment, the first determination module 62 is configured to: determine, as a target quick charging protocol, a quick charging protocol corresponding to the maximum charging power.

The charging module 63 is configured to charge by using the target quick charging protocol.

In an embodiment, the charging module 63 is configured to: determine a target charging parameter corresponding to the target quick charging protocol; control, according to the target charging parameter, a circuit control chip to adjust an input-output characteristic of a programmable circuit to a target input-output characteristic corresponding to the target charging parameter, the circuit control chip and the programmable circuit being both arranged in the terminal device; and, charge based on the target input-output characteristic.

In an embodiment, the charging module 63 is configured to: if the target quick charging protocol is the quick charging protocol for the last handshaking with the charging adapter, directly charge by using the target quick charging protocol; and, if the target quick charging protocol is not the quick charging protocol for the last handshaking with the charging adapter, handshake with the charging adapter again by using the target quick charging protocol for charging.

In an embodiment, the charging apparatus for a terminal device further includes: a saving module configured to save the charging power corresponding to the first quick charging protocol. Correspondingly, the charging apparatus for a terminal device further includes: a deletion module configured to delete each saved charging power corresponding to the respective quick charging protocol matched with the charging adapter.

In an embodiment, in an implementation, the charging apparatus for a terminal device further includes: a second determination module, a disconnection module and a reconnection module.

The second determination module is configured to: when it is determined that there is no quick charging protocol matched with the charging connection device in the terminal device, determine whether there is a quick charging protocol matched with the charging connection device in a server.

The disconnection module is configured to: when it is determined there is a quick charging protocol matched with the charging connection device in the server, download the quick charging protocol matched with the charging connection device, and disconnect the charging connection device.

The reconnection module is configured to reconnect the charging connection device at the end of downloading.

In an embodiment, the charging apparatus for a terminal device may further include an update acquisition module configured to, upon receiving an instruction of updating the quick charging protocol, acquire an updated quick charging protocol from the server.

The charging apparatus for a terminal device according to the embodiment of the present disclosure is configured to implement the charging method for a terminal device in the embodiment shown in FIG. 2, and the implementation principles and technical effects of the charging apparatus for a terminal device according to the embodiment of the present disclosure are similar to those described above and will not be repeated here.

Figure 7:
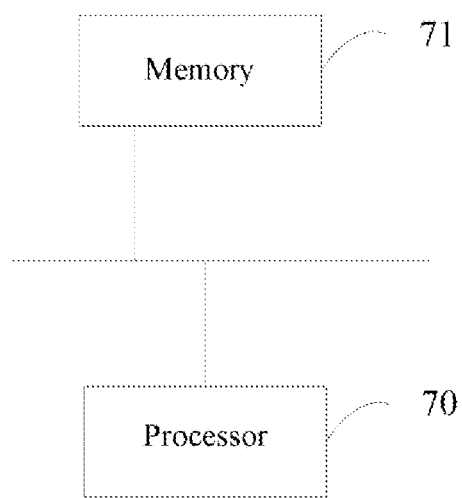
FIG. 7 is a schematic structural diagram of a terminal device according to an embodiment of the present disclosure.

FIG. 7 is a schematic structural diagram of a terminal device according to an embodiment of the present disclosure. As shown in FIG. 7, the terminal device includes a processor 70 and a memory 71. There may be one or more processors 70 in the terminal device. FIG. 7 is illustrated by taking one processor 70. The processor 70 and the memory 71 of the terminal device may be connected via a bus or in other ways. FIG. 7 is illustrated by taking the processor and the memory being connected via a bus as an example.

As a computer-readable storage medium, the memory 71 may store software programs, computer-executable programs and modules, for example, the program instructions and modules (e.g., the acquisition module 61, the first determination module 62 and the charging module 63 in the charging apparatus for a terminal device) corresponding to the charging method for a terminal device according to the embodiments of the present disclosure. By running the software programs, instructions and modules stored in the memory 71, the processor 70 executes various functional applications and data processing of the terminal device, i.e., implementing the charging method for a terminal device described above.

The memory 71 may mainly include a program storage region and a data storage region. The program storage region may store application programs required by the operating system and at least one function. The data storage region may store data created according to the use of the terminal device, etc. In addition, the memory 71 may include a high-speed random access memory, or may include a non-volatile memory, for example, at least one magnetic disk memory device, a flash memory device or other non-volatile solid-state memory devices. In some embodiments, the memory 71 may include memories remotely located relative to the processor 70. These remote memories may be connected to the terminal device via a network. Examples of the network include, but not limited to, the Internet, Intranet, local area networks, mobile communication networks and combinations thereof.

The present application further provides a storage medium containing computer-executable instructions which, when executed by a computer processor, cause the computer processor to execute a charging method for a terminal device. The method includes: when it is determined that the terminal device is connected to a charging connection device, acquiring each charging power corresponding to a respective one of a plurality of quick charging protocols stored in the terminal device that is matched with the charging connection device; determining, as a target quick charging protocol, a quick charging protocol corresponding to the charging power satisfying a preset condition; and, charging by using the target quick charging protocol.

Of course, in the storage medium containing computer-executable instructions provided by the present disclosure, the computer-executable instructions are not limited to the method operations descried above, and can execute related operations in the charging method for a terminal device according to any one of the embodiments of the present disclosure.

The foregoing description merely shows the embodiments of the present disclosure, and is not intended to limit the protection scope of the present disclosure.

Generally, various embodiments of the present disclosure may be implemented in hardware or dedicated circuits, software, logics or any combinations thereof. For example, some aspects may be implemented in hardware, while other aspects may be implemented in firmware or software that can be executed by a controller, a microprocessor or other computing devices, although the present disclosure is not limited thereto.

The embodiments of the present disclosure may be implemented by executing computer program instructions by a data processor of a mobile device, for example, in processor entities, or by hardware, or by a combination of software and hardware. The computer program instructions may be assembly instructions, instruction set architecture (ISA) instructions, machine instructions, machine-related instructions, microcodes, firmware instructions, state setting data, or source codes or target codes written in any combination of one or more programming languages.

The block diagrams of any logic flow in the accompanying drawings of the present disclosure may represent program steps, or may represent interconnected logic circuits, modules and functions, or may represent combinations of program steps and logic circuits, modules and functions. The computer programs may be stored on a memory. The memory may be of any type suitable for the local technical environment and may be implemented by using any suitable data storage technology, for example, but not limited to, read only memories (ROMs), random access memories (RAMs), optical memory devices and systems (digital versatile disks (DVDs) or CDs), etc. The computer-readable medium may include non-transient storage mediums. The data processor may be of any type suitable for the local technical environment, for example, but not limited to, general purpose computes, special purpose computers, microprocessors, digital signal processors (DSPs), application specific integrated circuits (ASICs), programmable logic devices (FGPAs), and processors based on a multi-core processor architecture.

The detailed description of the embodiments of the present disclosure has been provided above by way of exemplary and non-limiting examples. However, considering the accompanying drawings and the claims, various modifications and adjustments to the above embodiments are apparent for those having ordinary skill in the art, without departing from the scope of the present disclosure. Therefore, the appropriate scope of the present disclosure is defined by the claims.

The invention claimed is:

1. A charging method for a terminal device, comprising:
in response to determining that the terminal device is connected to a charging connection device, and in response to determining that there is no quick charging protocol matched with the charging connection device in the terminal device, determining whether there is a quick charging protocol matched with the charging connection device in a server;
in response to determining that there is a quick charging protocol matched with the charging connection device in the server, downloading the quick charging protocol matched with the charging connection device, and disconnecting the charging connection device;
reconnecting the charging connection device at the end of downloading;
acquiring each charging power corresponding to a respective one of a plurality of quick charging protocols stored in the terminal device that is matched with the charging connection device;
determining, as a target quick charging protocol, a quick charging protocol corresponding to the charging power satisfying a preset condition; and charging by using the target quick charging protocol.

2. The method of claim 1, wherein the step of charging by using the target quick charging protocol comprises:
determining a target charging parameter corresponding to the target quick charging protocol;
controlling, according to the target charging parameter, a circuit control chip to adjust an input-output characteristic of a programmable circuit to a target input-output characteristic corresponding to the target charging parameter, the circuit control chip and the programmable circuit being both arranged in the terminal device; and
charging based on the target input-output characteristic.

3. The method of claim 1, wherein the charging connection device is a charging adapter, and the step of acquiring each charging power corresponding to a respective one of a plurality of quick charging protocols stored in the terminal device that is matched with the charging connection device comprises:
in response to receiving a charging protocol handshake packet transmitted by the charging adapter, determining each of the plurality of quick charging protocols that is matched with the charging protocol handshake packet;
making a response according to each quick charging protocol matched with the charging protocol handshake packet; and
determining each charging power corresponding to a respective quick charging protocol matched with the charging protocol handshake packet.

4. The method of claim 3, wherein the step of acquiring each charging power corresponding to a respective one of a plurality of quick charging protocols stored in the terminal device that is matched with the charging connection device further comprises:
performing charging protocol detection on the charging adapter by using a first quick charging protocol;
in response to the charging adapter's response to the first quick charging protocol being detected, handshaking with the charging adapter by using the first quick charging protocol, determining a charging power corresponding to the first quick charging protocol, and using a second quick charging protocol as a new first quick charging protocol;
in response to the charging adapter's response to the first quick charging protocol not being detected, directly using a second quick charging protocol as a new first quick charging protocol; and
returning to the step of performing charging protocol detection on the charging adapter by using the first quick charging protocol until each charging power corresponding to the respective quick charging protocol matched with the charging adapter is acquired.

5. The method of claim 4, wherein the step of charging by using the target quick charging protocol comprises:
in response to the target quick charging protocol being the quick charging protocol for the last handshaking with the charging adapter, directly charging by using the target quick charging protocol; and
in response to the target quick charging protocol not being the quick charging protocol for the last handshaking with the charging adapter, handshaking with the charging adapter again by using the target quick charging protocol for charging.

6. The method of claim 4, after the step of determining a charging power corresponding to the first quick charging protocol, further comprising:

saving the charging power corresponding to the first quick charging protocol; and
after the step of charging by using the target quick charging protocol, the method further comprising:
deleting each saved charging power corresponding to the respective quick charging protocol matched with the charging adapter.

7. The method of claim 1, wherein the step of determining, as a target quick charging protocol, a quick charging protocol corresponding to the charging power satisfying a preset condition comprises:
determining, as a target quick charging protocol, a quick charging protocol corresponding to the maximum charging power.

8. The method of claim 1, further comprising:
in response to receiving an instruction of updating the quick charging protocol, acquiring an updated quick charging protocol from the server.

9. The method of claim 1, wherein the terminal device is in a power output mode, and the charging connection device is a device to be charged by the terminal device; and
the step of acquiring each charging power corresponding to a respective one of a plurality of quick charging protocols stored in the terminal device that is matched with the charging connection device comprises:
handshaking with the device to be charged by using a control protocol; and
after the handshaking is successful, negotiating and determining each quick charging protocol matched with the device to be charged by a transmission method defined in the control protocol, and
determining each charging power corresponding to the respective quick charging
protocol matched with the device to be charged.

10. A charging apparatus for a terminal device, comprising:
an acquisition module, configured to: in response to determining that the terminal device is connected to a charging connection device, acquire each charging power corresponding to a respective one of a plurality of quick charging protocols stored in the terminal device that is matched with the charging connection device;
a first determination module, configured to determine, as a target quick charging protocol, a quick charging protocol corresponding to the charging power satisfying a preset condition;
a charging module, configured to charge by using the target quick charging protocol;
a second determination module, configured to:
in response to determining that there is no quick charging protocol matched with the charging connection device in the terminal device, determine whether there is a quick charging protocol matched with the charging connection device in a server;
a disconnection module, configured to: in response to determining there is a quick charging protocol matched with the charging connection device in the server, download the quick charging protocol matched with the charging connection device, and disconnect the charging connection device; and
a reconnection module, configured to reconnect the charging connection device at the end of downloading.

11. The apparatus of claim 10, wherein the charging module is configured to:
determine a target charging parameter corresponding to the target quick charging protocol;

control, according to the target charging parameter, a circuit control chip to adjust an input-output characteristic of a programmable circuit to a target input-output characteristic corresponding to the target charging parameter, the circuit control chip and the programmable circuit being both arranged in the terminal device; and charge based on the target input-output characteristic.

12. The apparatus of claim 10, wherein the charging connection device is a charging adapter, and the acquisition module is configured to:

in response to receiving a charging protocol handshake packet transmitted by the charging adapter,
  determine each of the plurality of quick charging protocols that is matched with the charging protocol handshake packet;
  make a response according to each quick charging protocol matched with the charging protocol handshake packet; and
  determine each charging power corresponding to a respective quick charging protocol matched with the charging protocol handshake packet.

13. The apparatus of claim 12, wherein the acquisition module is further configured to:

perform charging protocol detection on the charging adapter by using a first quick charging protocol;
in response to detecting the charging adapter's response to the first quick charging protocol, handshake with the charging adapter by using the first quick charging protocol, determine a charging power corresponding to the first quick charging protocol, and use a second quick charging protocol as a new first quick charging protocol;
in response to not detecting the charging adapter's response to the first quick charging protocol, directly use a second quick charging protocol as a new first quick charging protocol; and
return to the step of performing charging protocol detection on the charging adapter by using the first quick charging protocol until each charging power corresponding to the respective quick charging protocol matched with the charging adapter is acquired.

14. The apparatus of claim 13, wherein the charging module is configured to:

in response to the target quick charging protocol being the quick charging protocol for the last handshaking with the charging adapter, directly charge by using the target quick charging protocol; and
in response to the target quick charging protocol not being the quick charging protocol for the last handshaking with the charging adapter, handshake with the charging adapter again by using the target quick charging protocol for charging.

15. The apparatus of claim 13, further comprising:

a saving module, configured to save the charging power corresponding to the first quick charging protocol; and
a deletion module, configured to delete each saved charging power corresponding to the respective quick charging protocol matched with the charging adapter.

16. The apparatus of claim 10, wherein the first determination module is configured to:

determine, as a target quick charging protocol, a quick charging protocol corresponding to the maximum charging power.

17. The apparatus of claim 10, wherein the charging apparatus for a terminal device is in a power output mode, and the charging connection device is a device to be charged by the terminal device; and the acquisition module is configured to:

handshake with the device to be charged by using a control protocol; and
after the handshaking is successful, negotiate and determine each quick charging protocol matched with the device to be charged by a transmission method defined in the control protocol, and
determine each charging power corresponding to the respective quick charging protocol matched with the device to be charged.

18. A non-transitory computer-readable storage medium storing computer programs which, when executed by a processor, cause the processor to perform a charging method for a terminal device, the method comprising:

in response to determining that the terminal device is connected to a charging connection device, and in response to determining that there is no quick charging protocol matched with the charging connection device in the terminal device, determining whether there is a quick charging protocol matched with the charging connection device in a server;
in response to determining that there is a quick charging protocol matched with the charging connection device in the server, downloading the quick charging protocol matched with the charging connection device, and disconnecting the charging connection device;
reconnecting the charging connection device at the end of downloading;
acquiring each charging power corresponding to a respective one of a plurality of quick charging protocols stored in the terminal device that is matched with the charging connection device;
determining, as a target quick charging protocol, a quick charging protocol corresponding to the charging power satisfying a preset condition; and
charging by using the target quick charging protocol.

* * * * *